US011685101B2

(12) United States Patent
Ormeggi

(10) Patent No.: US 11,685,101 B2
(45) Date of Patent: Jun. 27, 2023

(54) METHOD FOR MANUFACTURING A THERMOPLASTIC CONTAINER AND SYSTEM FOR PULLING A TUBE APART

(71) Applicant: Valunorm BVBA, Tervuren (BE)

(72) Inventor: Alain Pierre Ormeggi, Tervuren (BE)

(73) Assignee: VALUNORM BVBA, Tervuren (BE)

( * ) Notice: Subject to any disclaimer, the term of this patent is extended or adjusted under 35 U.S.C. 154(b) by 69 days.

(21) Appl. No.: 17/288,058

(22) PCT Filed: Oct. 16, 2019

(86) PCT No.: PCT/EP2019/078065
§ 371 (c)(1),
(2) Date: Apr. 23, 2021

(87) PCT Pub. No.: WO2020/083721
PCT Pub. Date: Apr. 30, 2020

(65) Prior Publication Data
US 2021/0394425 A1    Dec. 23, 2021

(30) Foreign Application Priority Data

Oct. 26, 2018   (BE) .................................. 2018/5744
Dec. 21, 2018   (BE) .................................. 2018/5937

(51) Int. Cl.
*B29C 51/02*    (2006.01)
*B29B 11/10*    (2006.01)
(Continued)

(52) U.S. Cl.
CPC .............. *B29C 51/02* (2013.01); *B29B 11/10* (2013.01); *B29C 49/04* (2013.01); *B29C 49/24* (2013.01);
(Continued)

(58) Field of Classification Search
CPC ......... B29B 11/10; B29B 11/06; B29B 11/14; B29C 49/24; B29C 55/22; B29C 49/04;
(Continued)

(56) References Cited

U.S. PATENT DOCUMENTS 2,817,221 A    12/1957   Newton
3,525,123 A     8/1970   Cines et al.
(Continued)

FOREIGN PATENT DOCUMENTS

DE            2224359 A1   11/1973
DE       102010040673 A1    3/2012
(Continued)

OTHER PUBLICATIONS

International Search Report (ISA/EP) for PCT/EP2019/078065 date completed Jan. 17, 2020 (6 pages).

*Primary Examiner* — Monica A Huson
(74) *Attorney, Agent, or Firm* — Alston & Bird LLP

(57) ABSTRACT

A method for manufacturing a thermoplastic container may include locally heating a middle zone of a thermoplastic tube; gripping the tube on either side by using retaining members; pulling the tube apart, causing a middle zone to narrow; pushing the inner wall of the middle zone against each other to obtain a closure; and cutting through the closed-off middle zone to obtain two separate tubular parts. Further is provided a system for pulling apart a tube, the system may include a first retaining member which is provided for insertion into the first zone via the first end and a second retaining member provided for insertion into the second zone via the second end, each retaining member being adjustable between a first position in which the retaining member fits inside the tube and a second position in which, in use, the retaining member exerts a pressure on the inner wall of the tube.

19 Claims, 9 Drawing Sheets

(51) Int. Cl.
*B29C 49/04* (2006.01)
*B29C 49/24* (2006.01)
*B29C 51/18* (2006.01)
B29K 101/12 (2006.01)
B29L 31/00 (2006.01)
C03B 23/11 (2006.01)

(52) U.S. Cl.
CPC .......... *B29C 51/18* (2013.01); *B29K 2101/12* (2013.01); *B29L 2031/712* (2013.01); *C03B 23/11* (2013.01)

(58) Field of Classification Search
CPC ..... B29C 51/02; B29C 49/42; B29C 67/0014; B29C 67/00; B29C 49/02; B29C 51/18; B29C 49/14; B29C 2793/0081; B29C 2949/26; B29C 2049/2412; B29C 2949/3016; B29C 2949/3064; B29C 2795/002; B29C 2949/3008; B29C 2949/22; B29C 2949/3012; B29C 2793/009; B29C 2949/24; B29C 2949/302; B29C 2949/28; B29C 2791/001; B29C 2949/08; B29C 49/00; B29C 57/10; B29K 2101/12; C03B 23/11; B29L 2031/712
See application file for complete search history.

(56) References Cited

U.S. PATENT DOCUMENTS 3,608,146 A * 9/1971 Dunipace ................ B29C 55/22
425/DIG. 53
4,929,168 A 5/1990 Jakobsen
6,946,092 B1 9/2005 Bertoeino

FOREIGN PATENT DOCUMENTS

| | | |
|---|---|---|
| EP | 0226410 A1 | 6/1987 |
| GB | 2099358 A | 12/1982 |
| JP | S6128623 U | 2/1986 |
| JP | H0419123 A | 1/1992 |

\* cited by examiner

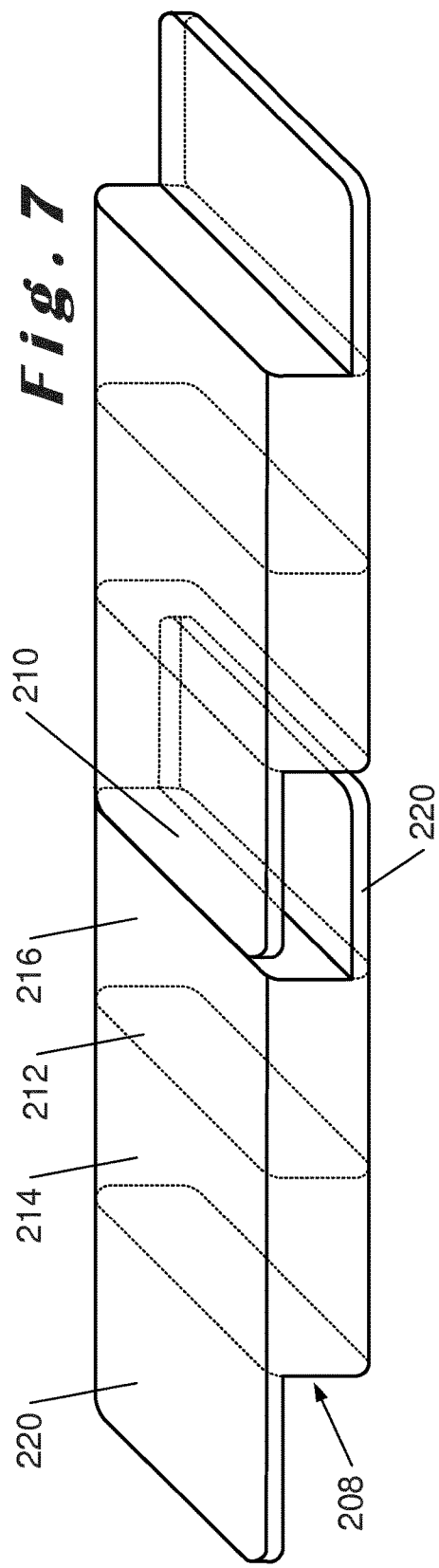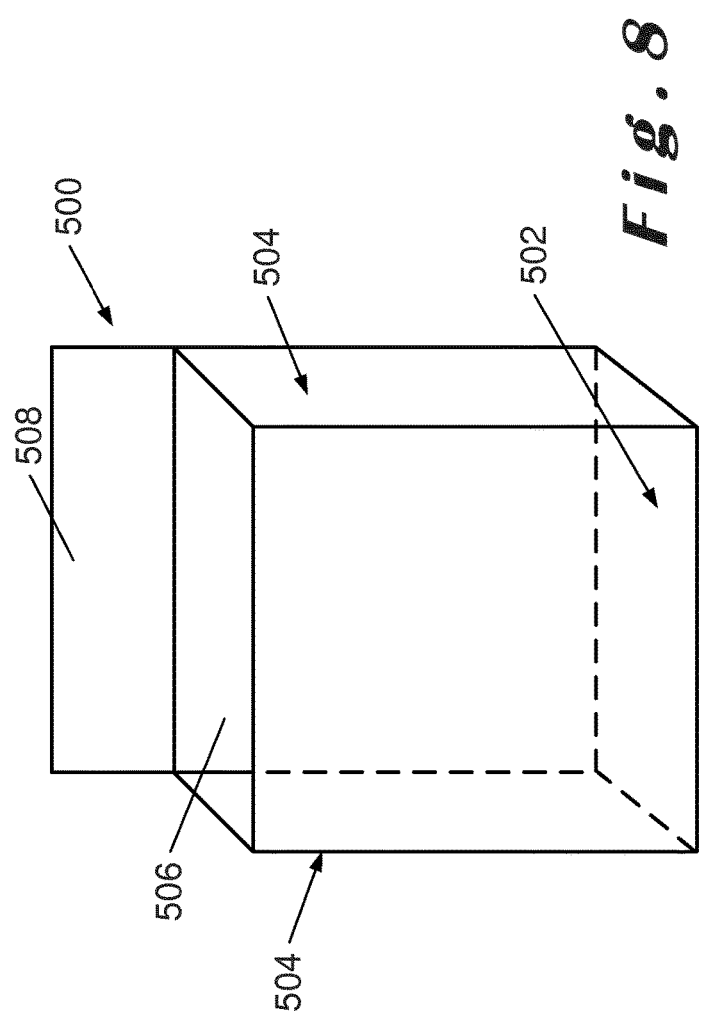

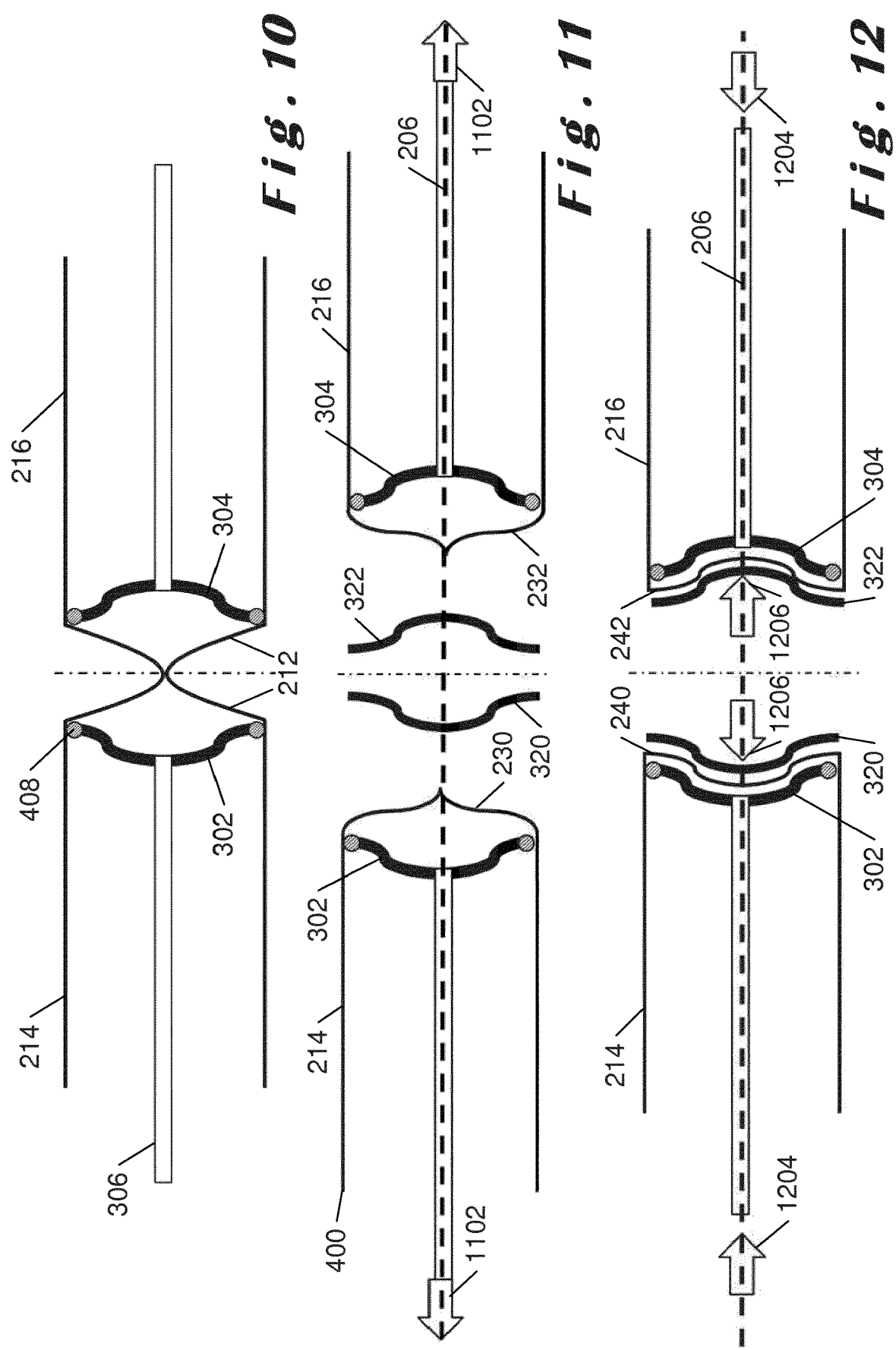

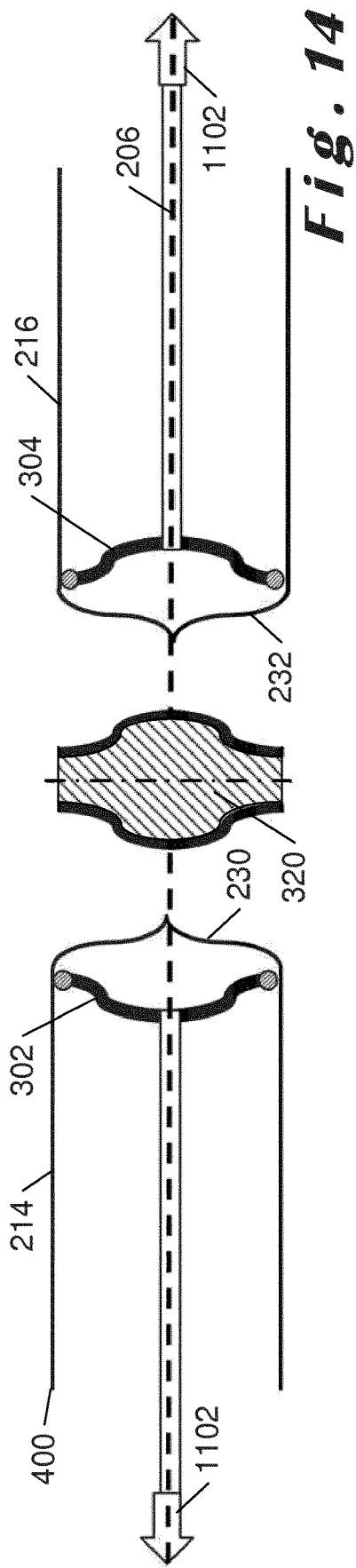
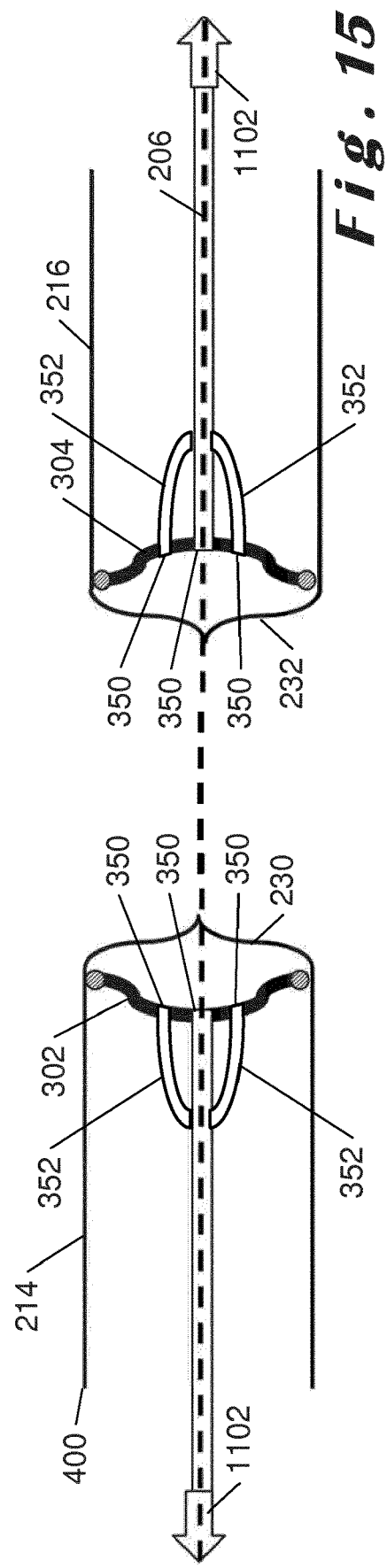

METHOD FOR MANUFACTURING A THERMOPLASTIC CONTAINER AND SYSTEM FOR PULLING A TUBE APART

CROSS-REFERENCE TO RELATED APPLICATIONS

This application is a national stage application filed under 35 U.S.C. § 371 of International Application No. PCT/EP2019/078065 filed Oct. 16, 2019, which application claims priority to Belgian Patent Application No. BE2018/5744 filed Oct. 26, 2018, and claims priority to Belgian Patent Application No. BE2018/5937 filed Dec. 21, 2018, each of the foregoing applications is hereby incorporated by reference in its entirety.

TECHNICAL FIELD

The present invention relates to a method for manufacturing a thermoplastic container. The present invention also relates to a system for pulling apart a tube, in particular a thermoplastic tube, and the use thereof in the manufacture of a thermoplastic container.

PRIOR ART

In the prior art, thermoplastic containers are used as packaging for various consumer goods, including detergents, food, for example in the form of liquids (such as beverages), solids (such as butter) or powder (such as chocolate flakes), and other objects, such as toys, kitchen utensils or parts for vehicles (e.g. parts of the engine). Depending on the desired application, containers are required over a whole variety of different dimensions with a wide range of different materials. Accordingly, various methods are known for manufacturing such containers depending on the application.

In a first known application, a container is made by thermoforming. A flat sheet of a thermoplastic is heated, for example by an infrared radiation source, until the thermoplastic has reached its thermoforming temperature, which is normally located between its glass transition temperature and its melting temperature. The flat sheet is then deformed locally by an external force, for example by deep drawing with a press or plug, in order to obtain the desired shape of the container. Typically, but not always, the sheet is also blown against the mould after deep drawing. This desired shape is then retained after the thermoplastic has cooled. Materials suitable for this process comprise, among others, polyvinyl chloride (PVC), acrylonitrile butadiene styrene (ABS), polyethylene (PE), polyethylene terephthalate (PET), polystyrene (PS) and polypropylene (PP). A typical example of a container made in this way is a butter tub.

A disadvantage of this method is that the relative dimensions of the container are limited. In particular, in practice, the depth of the container can almost never be greater than, or at least not significantly greater than, the length and/or the width of the container (i.e. its footprint). In addition, the ratio of the length to the width is often also limited such that, typically, the length is at most about twice the width.

Furthermore, the dimension of the upper opening of the container depends on the size of the press. Namely, the upper opening of the container must be large enough to allow the press to be removed. This also makes it impractical to provide an undercut.

Furthermore, deep drawing leads to the side walls being very thin and, in particular, thinner than the bottom. In other words, the container has no uniform thickness. These thin walls also limit the extent to which the container can further be inflated, since inflating the container too much can cause the already thin walls to become too thin, thereby compromising the integrity of the container.

Labels can be applied to the container by applying so-called 'in-mould labelling' or by applying the label after manufacturing of the container or by printing with ink after cooling of the container.

In a second known application, a container is made by injection moulding. Here, a thermoplastic in a liquid state is injected under high pressure into a die whose cavity is the shape of the desired container. The plastic solidifies by cooling. Materials suitable for this method comprise, among others, PE, PA, and PP. A typical example of a container made in this way is a reusable container, such as a bottle caps, reusable storage boxes, dustbins, etc.

A disadvantage of this method is that the entire container must be made out of the same thermoplastic polymer material. This makes it difficult to provide an odour and/or moisture barrier.

It is also practically impossible to provide shapes with an undercut as such moulds are very expensive. Namely, it is necessary that the central part of the die is then adjustable to a diameter that is smaller than the smallest diameter of the container, which is mechanically complex. In addition, the outer shape of the die must also consist of at least two halves. Such dies are, because of their high cost price, not economically applicable for the production of disposable containers, for example.

Furthermore, the container wall thickness should be large enough since the plastic, in its liquid state, must flow through the die. This also leads to a limitation of the relative dimensions of the container. In particular, the following rule of thumb applies, namely, the larger the volume of the container, the thicker the walls should be. However, the time required for the container to cool, i.e., harden, in the die increases rapidly depending on the thickness of the walls. In other words, the production of large containers takes considerably more time and is therefore less economically interesting.

In addition, it is theoretically possible to apply a print to the container by providing the corresponding shape on the die, but with every change in the shape of the pre-print, the die must be replaced, which is excessively expensive. Applying a label during the production of the container is also very cumbersome and usually requires the use of a vacuum installation to prevent liquid plastic from getting between the label and the die. Also, a new label design often leads to stocks of previous labels being discarded and/or a new device being required to manufacture the new labels.

In a third known application, a container is made by blow moulding, also known as extrusion blow moulding. Here, a thermoplastic is first extruded into a continuous preform (a so-called 'parison'), for example a hollow tube. Immediately afterwards, the preform, which is still warm and semi-liquid, is placed in a mould and is blown against the mould with the aid of a gas, for example compressed air in order to obtain the desired shape of the container. This desired shape is then retained after the formed thermoplastic has cooled. This type of blow moulding is therefore an almost continuous process. Materials suitable for this method comprise, among others, PE and PP. A typical example of a container made in this way is a bottle for fabric softener or detergent.

A disadvantage of this method is that the PET material is difficult to use in practical applications. In general, extrusion blow moulding is very sensitive since the parison is almost liquid, so that the preform can deform undesirably even in the case of small air disturbances, such as the opening of an outside door in a production hall. Since PET is even more liquid compared to other materials (such as PE or PP), undesired deformation can even lead to a collapse of the parison, a so-called drawdown.

Furthermore, the blowing causes different parts of the preform to expand differently, so that the thicknesses of the different walls of the container are not uniform. The wall must also be relatively thick so that the parison is formed sufficiently firmly. Labels can be applied to the container by applying so-called 'in-mould labelling' or by applying the label after the container has been made or by printing it on the container afterwards.

Blow moulding can also be used, in modified form, for the manufacture of containers (e.g. bottles) for water or soft drinks based on PET. This is known as injection blow moulding or also injection stretch blow moulding. A preform is obtained by injection moulding. The preform is then heated and subsequently blow moulded to a larger form. When blow moulding is assisted by the mechanical stretching by means of a stretching rod, the process is called injection stretch blow moulding. This type of preform is used after it has cooled down and is typically completely solid and, in particular, much more solid compared to a parison, making the PET material usable when compared to extrusion blow moulding. On the other hand, since the preform is the result of injection moulding, it is not possible to add a layer for moisture or odour barrier, and pre-printing is also not feasible here. Injection stretch blow moulding also results is low wall thickness, which renders undercuts and anisotropic shapes rather hard to achieve. Undercuts can be provided during blow moulding, but this causes a local thinning of the walls of the container, which is undesirable.

Also, an installation for injection blow moulding is relatively expensive.

GB 2 099 358 A, U.S. Pat. Nos. 4,929,168 A, 4,988,399 A, 3,525,123 A disclose methods and systems for deforming a thermoplastic tube into a container, which methods make use of stretching the tube.

DESCRIPTION OF THE INVENTION

It is an object of the present invention to provide a method for manufacturing a thermoplastic container wherein there is less limitation on the relative dimensions of the container.

This object is achieved by means of a method for manufacturing a thermoplastic container, the method comprising: a) providing a thermoplastic tube with an inner wall, an outer wall, a longitudinal direction, a first end, a second end, a middle zone, a first zone and a second zone, the first zone extending from the middle zone to said first end and the second zone extending from the middle zone to said second end; b) gripping said first zone and said second zone; c) locally heating said middle zone to the thermoforming temperature of the thermoplastic; d) pulling said first zone and said second zone apart along said longitudinal direction thereby narrowing the middle zone; e) closing a closing portion of the middle zone to obtain a closure; f) cutting through the closed-off middle zone at the location of the closing portion to obtain two separate tubular parts; g-ii) placing at least one of the tubular parts in a mould; h-ii) heating said tubular part in the mould to the thermoforming temperature of the thermoplastic; and i-ii) deforming said tubular part against the mould to obtain said container, said deforming preferably comprising at least one of: blow moulding, vacuum forming and pressing.

In step a) a thermoplastic tube is provided with a middle zone, a first zone and a second zone. Already in this step the dimensions of the container have already been substantially determined. After all, they are chosen such that, during the blow moulding in step i), the tubular part only needs to deform minimally. Hence, the final footprint of the container substantially corresponds to the cross-section of the tube and the depth of the container substantially corresponds to the height of the first and second zone, respectively. The dimensions of the tube can in particular be chosen such that they are just small enough to be placed in the mould.

The method also makes it possible to obtain relatively large absolute dimensions of the container with relatively thin walls. This is partly because with this method there is no need for injection moulding, which would entail thick walls, and also because there is no need for a parison, which is often too liquid to manufacture sufficiently large containers without having relatively thick wall.

There are also fewer limitations to applying undercuts. Namely, in no step in the process is there any need for a plug or similar element to be arranged within the tube or container for deformation thereof. Hence, the wall thickness of the container before the blow moulding can be much thicker compared to the existing methods, leaving sufficient material for the locally high deformation required for an undercut.

Furthermore, there is also no need to use a parison such that this method is also suitable for manufacturing PET containers and other materials that are typically too sensitive for extrusion blow moulding.

In addition, this method allows an ink-print to be applied directly to the thermoplastic tube, in particular to the first and/or second zone, since the deformation is minimised during blow moulding as described in more detail below.

Also, the final container, at least the side walls thereof, has a more uniform wall thickness as compared to containers made with the existing methods since the tube initially has a uniform thickness and it is only deformed to a relatively small extent.

In practice it has been found that when applied to certain thermoplastics, the method described above can lead to the bottom of the container being fairly brittle. This is because the bottom of the container that emerges from the middle zone is normally heated at least twice during the process, namely during the pulling apart of the tube and later during blow moulding. However, it is known that such successive heating cycles are detrimental to the integrity and/or resilience of certain thermoplastics.

It is an alternative object of the invention to provide a method for manufacturing a thermoplastic container, wherein there is less limitation on the relative dimensions of the container and wherein there is less limitation on the choice of the thermoplastic material.

This alternative object of the invention is achieved by an alternative method for manufacturing a thermoplastic container, the method comprising: a) providing a thermoplastic tube with an inner wall, an outer wall, a longitudinal direction, a first end, a second end, a middle zone, a first zone and a second zone, the first zone extending from the middle zone to said first end and the second zone extending from the middle zone to said second end; b) gripping said first zone and said second zone with the aid of retaining members, each of said retaining members having a mould surface which is substantially perpendicular to said longitudinal direction and is located along said middle zone; c) locally heating said middle zone to the thermoforming temperature of the thermoplastic; d) pulling said first zone and said second zone apart along said longitudinal direction thereby narrowing the middle zone by moving said retaining members away from each other; e) closing a closing portion of the middle zone to obtain a closure; f) cutting through the closed middle zone at the location of the closing portion to split the middle zone into a first portion and a second portion so that said tube is split into a first and a second tubular part, the first tubular part comprising said first zone and a first bottom portion, which first bottom portion is formed by said first portion of the middle zone and the second tubular part comprising said second zone and a second bottom portion, which second bottom portion is formed by said second portion of the middle zone; g-i) arranging, for at least the first tubular part, a bottom moulding member opposite a respective one of said retaining members such that said first bottom portion is located between the bottom moulding member and the respective retaining member, each bottom moulding member being provided with a counter mould surface which is substantially perpendicular to said longitudinal direction and is oriented towards its respective mould surface; and h-i) deforming said first bottom portion into a bottom by pressing the bottom moulding member and its respective gripping organ against each other.

The same advantages are retained in this alternative method, for example that the dimensions of the container have already been predominantly determined in step a). Moreover, the dimensions of the container may even be completely determined in step a) in case the container is no longer deformed after step h-i).

This alternative method further has the advantage that after splitting the tube there is no need to reheat each tubular part before blow moulding in a mould. On the contrary, after splitting, the bottom is immediately formed by the bottom portions created from the split of the middle zone.

In an embodiment of the alternative method, step h-i) comprises venting gas from a space between said mould surface and said first bottom portion, each retaining member preferably being provided with a gas venting opening for this venting.

This prevents an overpressure from being created between a retaining member and a bottom portion during the pressing of the mould surface and the counter mould surface against each other.

In an embodiment of the alternative method, steps d), e), f), g-i) and h-i) are carried out without allowing said middle zone to cool to below the thermoforming temperature of the thermoplastic.

This alternative object is also achieved by an another method for manufacturing a thermoplastic container, the method comprising: a) providing a thermoplastic tube with an inner wall, an outer wall, a longitudinal direction, a first end, a second end, a middle zone, a first zone and a second zone, the first zone extending from the middle zone to said first end and the second zone extending from the middle zone to said second end; b) gripping said first zone and said second zone with the aid of retaining members, each of said retaining members having a mould surface which is substantially perpendicular to said longitudinal direction and is located along said middle zone; c) locally heating said middle zone to the thermoforming temperature of the thermoplastic; d) pulling said first zone and said second zone apart along said longitudinal direction thereby narrowing the middle zone by moving said retaining members away from each other; e) closing a closing portion of the middle zone to obtain a closure; f) cutting through the closed-off middle zone at the location of the closing portion to split the middle zone into a first portion and a second portion so that said tube is split into a first and a second tubular part, the first tubular part comprising said first zone and a first bottom portion, which first bottom portion is formed by said first portion of the middle zone and the second tubular part comprising said second zone and a second bottom portion, which second bottom portion is formed by said second portion of the middle zone; and g-iii) for at least the first tubular part, sucking gas away from a space between said mould surface and said first bottom portion for the purpose of deforming said first bottom portion until it abuts said mould surface.

The same advantages are retained in this other method, for example that the dimensions of the container have already been substantially determined in step a). Moreover, the dimensions of the container may even be completely determined in step a) in case the container is no longer deformed after step g-iii).

This other method also has the advantage that after splitting the tube there is no need to reheat each tubular part before blow moulding in a mould. On the contrary, after splitting, the bottom is immediately formed by the bottom portions created from the split of the middle zone by the vacuum moulding of the bottom portion.

Obtaining the closure in step e) can be done in various ways.

In a first embodiment, step e) comprises the further heating of at least the closing portion of said middle zone to above the melting temperature of the thermoplastic before pushing the inner walls against each other so that the pushed against one another inner walls fuse to obtain the closure.

In a second embodiment, step a) comprises co-extruding the tube with an inner layer formed by a low-density polyethylene, a linear low-density polyethylene or another thermoplastic having a low melting temperature and step e) comprises the further heating of at least the closing portion of said middle zone to above the melting temperature of the low-density polyethylene or the linear low-density polyethylene before pushing the inner walls against each other so that the pushed against one another inner walls fuse to obtain the closure.

In a third embodiment, step a) comprises applying an adhesive layer on the inner wall of said middle zone at least at the location of said closing portion and step e) comprises, after the inner walls have been pushed against each other, curing the adhesive layer to obtain the closure.

These alternative options make it possible to manufacture the closure in different ways depending on the desired application. For example, certain thermoplastics are less suitable for the manufacture of a closure by melting (i.e. heat sealing), while a co-extrusion increases the cost price, which is not always desirable.

Obtaining the thermoplastic tube in step a) can be done in various ways.

In a first embodiment, step a) comprises extruding the tube.

In a second embodiment, step a) comprises co-extruding the tube.

In a third embodiment, step a) comprises injection moulding the tube.

These alternative options make it possible to manufacture the thermoplastic tube in different ways depending on the desired application. The desired thickness of the tube can therefore be taken into account before deciding which process is used.

In the second embodiment, the co-extrusion can be used to produce at least one layer that forms an odour barrier and/or a moisture barrier. Optionally, the inner layer can also be made of low-density polyethylene or linear low-density polyethylene for the closure of step e).

The methods according to the invention are suitable for a wide variety of thermoplastics, including polyethylene terephthalate, polypropylene, polyvinyl chloride, polystyrene, acrylonitrile butadiene styrene, polyethylene and biopolymers, in particular polylactic acid.

In an advantageous embodiment, step a) comprises applying an ink pre-print to an outer wall of the tube. Here, the ink pre-print has, preferably, a design that takes into account the deformation by blow moulding in step i-ii).

The ink pre-print can be used to convey information to the consumer, such as the brand name, characteristics of the container, etc. In other words, the ink pre-print can serve as a substitute for a label to be applied with an in-mould process or afterwards. Such ink pre-prints are also difficult to remove, unlike a label. Moreover, such an ink pre-print is also more environmentally friendly than a label since the ink pre-print is applied directly to the container, while the label may be made of a material other than the container, which makes recycling more difficult. This enables making single material containers In an embodiment, step g-ii) comprises placing a label between the tubular part and the mould.

This makes it possible to apply a label to the container via an in-mould labelling process.

In an advantageous embodiment, step a) comprises providing said tube with, at its first end and at its second end, a protruding portion which is integrally manufactured with the tube and the method further comprises step j) deforming said protruding portion into a lid for the container.

By providing an integrally manufactured protruding portion at the ends, which ends form the top of the container, these portions can be used to form the lid of the container.

In an embodiment, step e) comprises pushing the inner wall of said closing portion against each other to obtain said closure.

In an alternative embodiment, step e) comprises rotating, around said longitudinal direction, said first zone and said second zone in the opposite direction relative to each other to obtain said closure.

These alternative embodiments allow the closure to be obtained in various ways.

It is a further object of the present invention to provide a system for pulling apart a tube.

This further object is achieved by means of a system for pulling apart a tube, which tube has an inner wall, an outer wall, a longitudinal direction, a first end, a second end, a middle zone, a first zone and a second zone, wherein the first zone extends from the middle zone to said first end and the second zone extends from the middle zone to said second end, the system comprising: a first retaining member which is provided for insertion into the first zone via the first end; a second retaining member provided for insertion into the second zone via the second end, each retaining member being adjustable between a first position in which the retaining member fits inside the tube and a second position in which, in use, the retaining member exerts a pressure on the inner wall of the tube; and actuation means configured to: insert the retaining members in their first position into their respective zone of the tube; subsequently bring the retaining members into their second position so that they exert a pressure on the inner wall of the tube to obtain a temporary fixed connection between a retaining member and its respective zone; and then move the retaining members away from each other to move the first zone and the second zone of the tube away from each other.

By using such a system it is possible to make a temporary fixed connection between a retaining member and its respective zone so that movement of the retaining members leads to the zones moving away from each other.

In an embodiment, each retaining member is provided with an inflatable annular element that has a deflated position in which the annular element fits inside the tube and has an inflated position in which the annular element, in use, exerts a pressure on the inner wall of the tube.

The deflated position of the annular element corresponds to the first position of the retaining member and the inflated position of the annular element corresponds to the second position of the retaining member. The use of inflatable means has the advantage that the pressure is applied more evenly to the tube, in contrast to mechanical means, so that there is less chance of damage to the tube. Inflatable means are also relatively inexpensive compared to mechanical means.

Preferably, the annular element is located in a groove provided on the retaining members. In an embodiment, the groove is formed between two plate-shaped elements that each have a shape corresponding to a cross-section of the tube. It is advantageous if one of the plate-shaped elements, typically the outermost, is mounted on a movable arm that is configured to be actuated by the actuation means. In another embodiment, each retaining member is integrally manufactured.

In an advantageous embodiment, the actuation means are further configured to insert the first retaining member in the first zone of the tube as close as possible to the middle zone and to insert the second retaining member in the second zone of the tube as close as possible to the middle zone.

This reduces the risk of deformation of the first and second zone during the subsequent pulling apart of the zones.

The tube can be made from various materials, including metal, glass or a thermoplastic, such as the ones described above in relation to the methods according to the invention.

In an advantageous embodiment, the system further comprises heating means which are provided to heat said middle zone and wherein the actuation means are further configured to actuate the heating means to heat said middle zone before the retaining members are actuated to move away from each other.

The heating means make it easier to move the first and second zones away from each other with a limited force.

In an embodiment, a length of the middle zone is selected depending on a desired thickness of a bottom of the container.

Namely, stretching the middle zone locally reduces the wall thickness. By making the middle zone sufficiently long, it is possible to minimise the local deformation of the wall during stretching so that the bottom of the container, said bottom being formed by a portion of the middle zone, is sufficiently thick.

In an embodiment, the tube is made of a thermoplastic and the system further comprises splitting means that are movable substantially transversely with respect to said longitudinal direction to split the middle zone into a first portion and a second portion so that said tube is split into a first and a second tubular part, wherein the first tubular part comprises said first zone and a first bottom portion, which first bottom portion is formed by said first part of the middle zone and wherein the second tubular part comprises said second zone and a second bottom portion, which second bottom portion is formed by said second part of the middle zone, and wherein the actuation means are further configured, after the retaining members have moved away from each other, to move the splitting means transversely, in particular towards each other, to split said tube into said tubular parts.

This system allows not only the thermoplastic tube to be pulled apart but also this tube to be divided into two tubular parts.

In a preferred embodiment, each of said retaining members comprises a mould surface configured to be positioned substantially perpendicular to said longitudinal direction and along said middle zone, the system further comprising: a first bottom moulding member provided to cooperate with said first retaining member to deform said first bottom portion; a second bottom moulding member provided to cooperate with said second retaining member to deform said second bottom portion, each bottom moulding member comprising a counter mould surface corresponding to its respective mould surface and is configured to be positioned primarily perpendicular to said longitudinal direction and oriented towards its respective mould surface, and wherein the actuation means are further configured to, after the splitting means have split the tube: position the first bottom moulding member opposite the first retaining member and the second bottom moulding member opposite the second retaining member; and then press the first bottom moulding member and the first retaining member against each other to deform said first bottom portion into a bottom and press the second bottom moulding member and the second retaining member against each other to deform said second bottom portion into a bottom.

This system makes it possible, after the tube has been split into tubular parts, to deform the bottom portion of each tubular part into a bottom without having to make use of an additional blow moulding step. Hence also avoiding two successive heating phases.

In a further preferred embodiment, each retaining member is provided with a gas venting opening configured to vent a gas from a space formed between said mould surface and said first bottom portion. This gas venting opening is in particular formed by making the movable arm hollow.

As above, such a gas venting opening prevents an overpressure from arising between the mould surface and the bottom portion of the tubular part.

In an alternative preferred embodiment, each of said retaining members comprises a mould surface configured to be positioned substantially perpendicular to said longitudinal direction and along said middle zone, each retaining member being provided with a plurality of gas venting openings configured to vent a gas from a space formed between said mould surface and said first bottom portion, which system is further provided with extraction means configured to extract gas from a space between said mould surface and said first bottom portion via said gas venting openings.

This system allows, after the tube has been split into tubular parts, the bottom portion of each tubular part to be deformed into a bottom without having to use an additional blow moulding step and without having to use one or more bottom moulding members.

The object of the invention is also achieved by the use of a system as described above for performing steps c) and d) of the methods described above.

The alternative object of the invention is also achieved by using a system as described above for performing steps g-i) and h-i) of the method as described above and also by using a system as described above for performing step g-iii) of the method as described above.

In a further embodiment, the invention provides a method for manufacturing a thermoplastic container, the method comprising: a) providing a thermoplastic tube with an inner wall, an outer wall, a longitudinal direction, a first end, a second end, a middle zone, a first zone and a second zone, the first zone extending from the middle zone to said first end and the second zone extending from the middle zone to said second end; b) gripping said first zone and said second zone; c) locally heating said middle zone to the thermoforming temperature of the thermoplastic; d) pulling said first zone and said second zone apart along said longitudinal direction, thereby narrowing the middle zone; e) closing a closing portion of the middle zone to obtain a closure; f) cutting through the closed-off middle zone at the location of the closing portion to obtain two separate tubular parts; and g-iv) deforming at least one of said tubular parts into a container.

Details about steps a) to f) are already described above. In an embodiment, steps g-iv) comprise steps g-i) and h-i), which have already been described above. In an embodiment, steps g-iv) comprise steps g-ii), h-ii) and i-ii), which have already been described above. In an embodiment, steps g-iv) comprise steps g-i), h-i), g-ii), h-ii) and i-ii), which have already been described above. In an embodiment, steps g-iv) comprise steps g-iii), which have already been described above. In an embodiment, steps g-iv) comprise steps g-iii), g-ii), h-ii) and i-ii), which have already been described above.

At least the advantage relating to the dimensions of the container is achieved by this method. Moreover, other advantages described above may also be applicable depending on the nature of step g-iv).

BRIEF DESCRIPTION OF THE DRAWINGS

The invention will hereafter be further explained in detail by way of the following description and the accompanying drawings.

FIG. 7 shows an alternative thermoplastic tube for use in the method of FIG. 1.

FIG. 8 shows a thermoplastic container made with the method of FIG. 1.

FIGS. 10 to 12 show the successive steps for forming a bottom of the thermoplastic container in the method of FIG. 9.

FIG. 14 shows the same view as FIG. 11 with an alternative bottom moulding member.

FIG. 15 shows the same view as FIG. 11 with alternative retaining members.

EMBODIMENTS OF THE INVENTION

Figure 1:
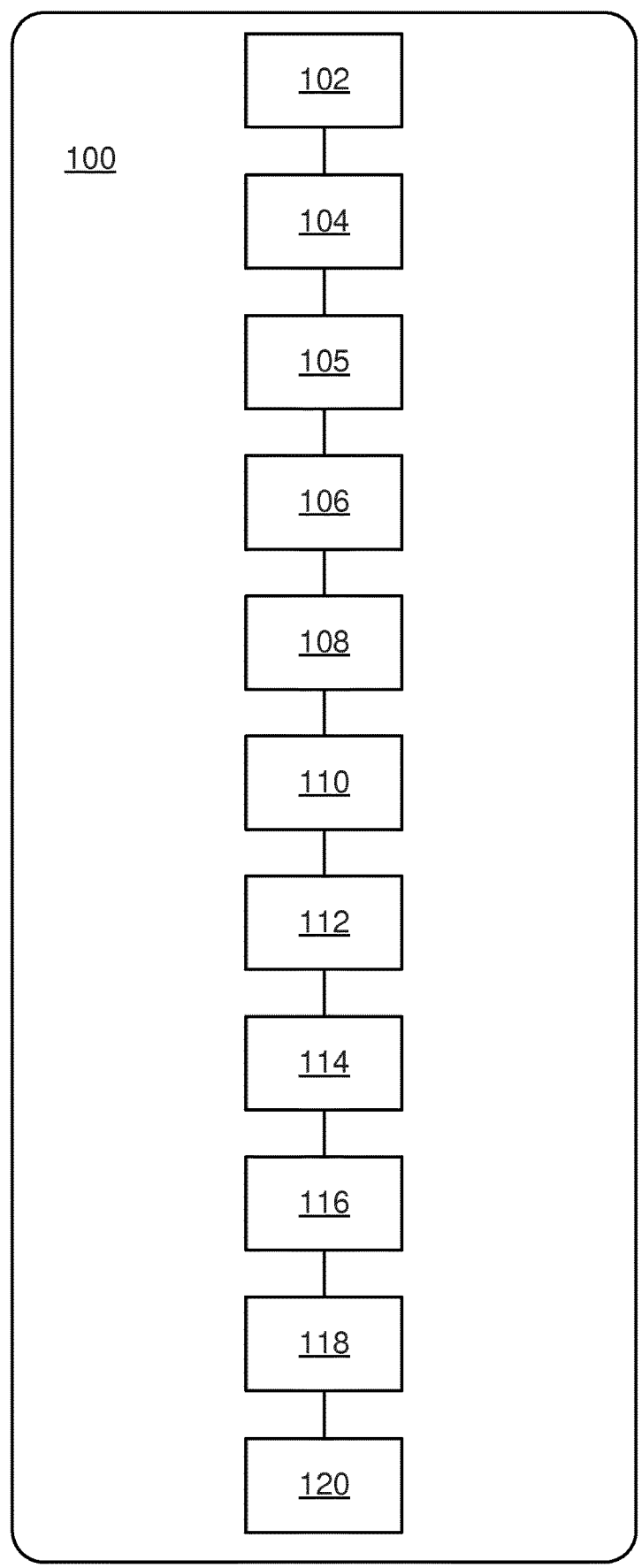
FIG. 1 shows a flowchart of a method for manufacturing a thermoplastic container.

Although the present invention will hereinafter be described with respect to particular embodiments and with reference to certain drawings, the invention is not limited thereto and is only defined by the claims. The drawings shown here are merely schematic representations and are not limiting. In the drawings, the size of some of the elements may be exaggerated and not drawn to scale for illustrative purposes. The dimensions and the relative dimensions do not necessarily correspond to actual practical implementations of the invention.

In addition, terms such as 'first', 'second', 'third', and the like are used in the description and in the claims in order to make a distinction between similar elements and not necessarily in order to indicate a sequential or chronological order. It is to be understood that the terms in question are interchangeable under appropriate circumstances and that the embodiments of the invention described herein are capable of operation in other sequences than described or illustrated herein.

Moreover, terms such as 'top', 'bottom', 'above', 'under' and the like in the description and the claims are used for descriptive purposes. It is to be understood that the terms so used are interchangeable under appropriate circumstances and that the embodiments of the invention described herein are capable of operation in other orientations than described or illustrated herein.

It is to be noted that the term 'comprising', or its derivatives, used in the claims, should not be interpreted as being restricted to the means listed thereafter; the term does not exclude other elements or steps. It is thus to be interpreted as specifying the presence of the stated features, integers, steps or components as referred to, but does not preclude the presence or addition of one or more other features, integers, steps or components, or groups thereof. Thus, the scope of an expression such as 'a device comprising means A and B' should not be limited to devices consisting only of components A and B. It means that with respect to the present invention, the only relevant components of the device are A and B.

As used herein, the term 'container' means a typically thin-walled, volume-containing object. Examples are reusable boxes for storing goods, packaging, car parts, etc.

Figure 2:
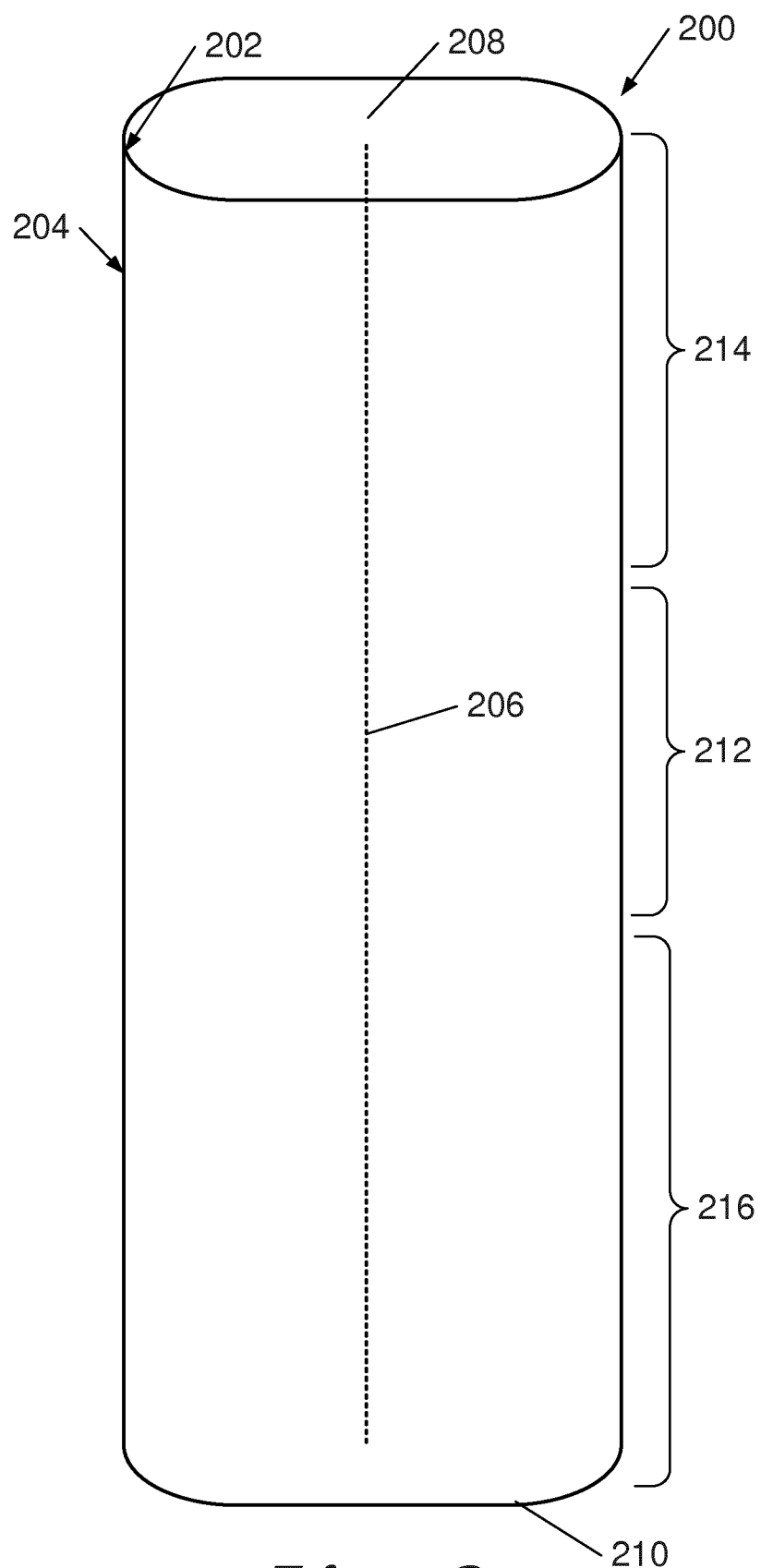
FIG. 2 shows a thermoplastic tube for use in the method of FIG. 1.

FIG. 1 shows a flowchart of a method 100 for manufacturing a thermoplastic container. In step 102, a thermoplastic tube 200 is provided with an inner wall 202, an outer wall 204, a longitudinal direction 206, a first end 208, a second end 210, a middle zone 212, a first zone 214 and a second zone 216, the first zone 214 extending from the middle zone 212 to said first end 208 and the second zone 216 extending from the middle zone 212 to said second end 210 as shown in FIG. 2.

Figure 6:
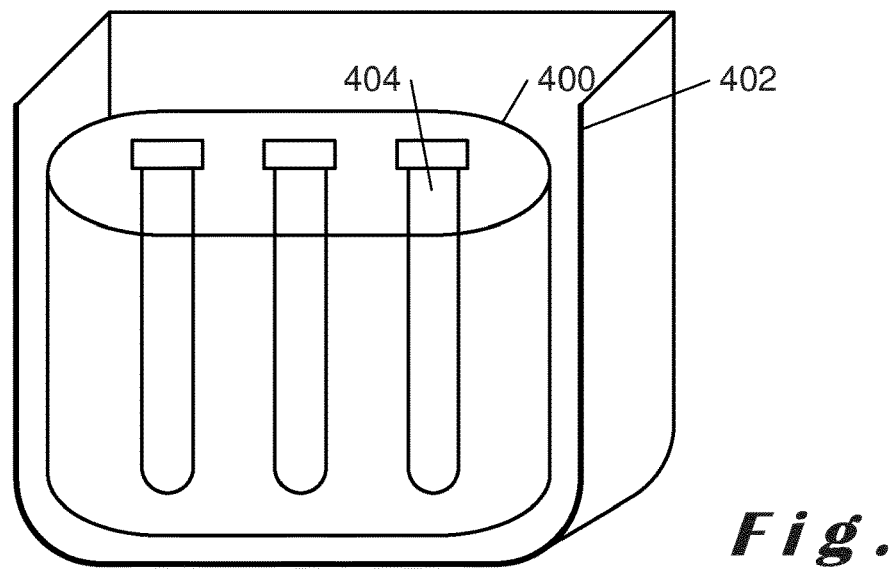
FIG. 6 shows a system for blow moulding the container for use in the method of FIG. 1 where the front part of the mould has been omitted.

Each of the zones 214, 216 will be deformed into a container. This container 500 can, as shown in FIG. 8, be provided with a lid 508. However, the container 500 does not necessarily have to have a lid 508. It is sufficient that the container 500 is provided with a bottom 502, side walls 504 (of which only two are indicated by a reference numeral) and a top opening 506. The wall of the tube 200 in the zones 214, 216 forms the side walls 504 of the container 500 and the middle zone 212 will serve to manufacture the bottoms 502 of the containers 500, i.e. the middle zone 212 serves to produce two separate bottoms 502. The tube 200 shown in FIG. 2 is not provided to form a container 500 with lid 508, but to form a container around an open top 506 (as shown in FIG. 6), while the tube 200 shown in FIG. 7 is provided for this purpose by the additional portions 220 at the ends 208, 210, which additional portions 220 will form the cover 508.

In an embodiment, the tube 200 is extruded. This can be done by introducing solid pellets of the thermoplastic into a extrusion machine that heats them up so that they become liquid and then pressing them through the die to produce the hollow tube 200. Suitable thermoplastics are polyvinyl chloride (PVC), acrylonitrile butadiene styrene (ABS), polyethylene (PE), polyethylene terephthalate (PET), polystyrene (PS), polypropylene (PP) and biopolymers such as polylactic acid.

The extrusion process is carried out continuously. In addition, a co-extrusion can also be used to obtain a multi-layered tube 200. In this way, an odour barrier and/or a moisture barrier can be formed. An inner layer can also be made from a low-density polyethylene, a linear low-density polyethylene or other heat sealable materials, which, as described below, is advantageous for obtaining the closure of the middle zone 212.

In another embodiment, injection moulding is used to manufacture the tube 200.

The dimensions of the tube 200, in particular the cross-section, are determined by the final desired shape of the container. In particular, the cross-section is ideally chosen which corresponds as closely as possible to the ground surface, i.e. the footprint, of the container.

In step 104, an ink pre-print can optionally be applied to the outer wall 204, for example by means of rollers, pads, inkjet printing, offset printing, etc. When designing the ink pre-print (i.e. the effective design), account should preferably be taken of the deformation, although it is minimal, which the wall of the tube 200 will undergo in the blow moulding step (step 118). Being able to form the ink pre-print directly in the tube 200 has the advantage that, after manufacturing the container, no additional label needs to be provided and/or applied, which additional label is typically made from a material other than the container, whereby the recycling of the container becomes more difficult. The ink pre-print is preferably applied before the tube 200 is cut into pieces, which pieces serve for the manufacture of two containers. This makes it possible to apply the ink pre-print in-line with during the extruding of the tube.

In step 105, the zones 214, 216 are gripped as described in more detail below. In step 106, the middle zone 212 is locally heated to the thermoforming temperature of the thermoplastic, which is typically above the glass transition temperature and below the melting temperature. This heating can be done in various ways, including the use of infrared lamps or heating air flows. The purpose of this step is to make the middle zone 212 locally deformable. To this end, care should be taken to ensure that the temperature remains lower than the melting temperature of the thermoplastic to prevent the middle zone 212 from collapsing altogether.

In step 108, the first and second zones 214, 216 are pulled apart along the longitudinal direction 206. One of the two zones 214, 216 can remain stationary, but both zones 214, 216 can also undergo a translation. It will be appreciated that due to the stretching out of the middle zone the wall thins locally, which thinning can be minimised by making the middle zone sufficiently long as already described above.

Figure 3:
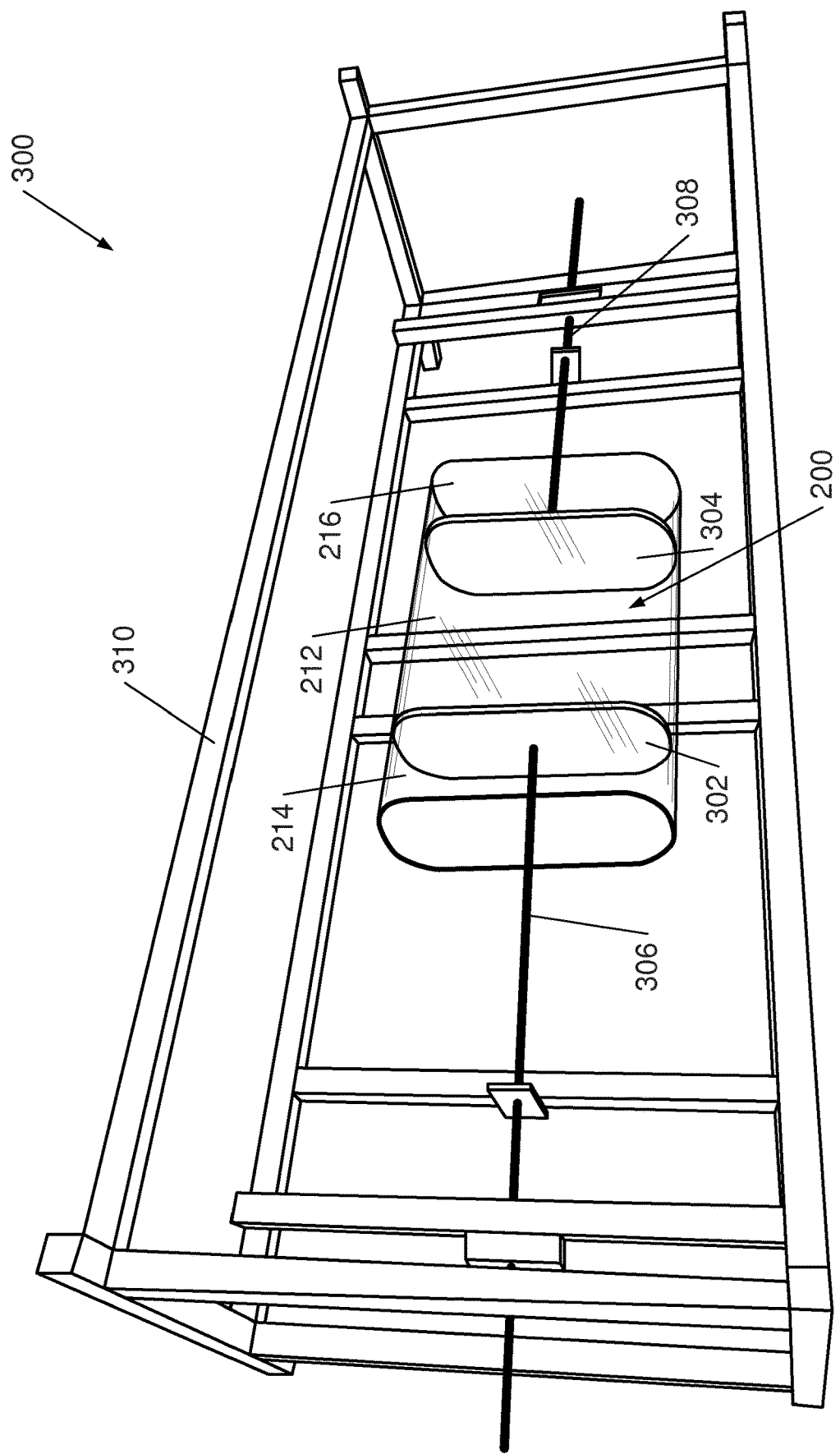
FIG. 3 shows a system for pulling the tube of FIG. 2 apart for use in the method of FIG. 1.
Figure 4:
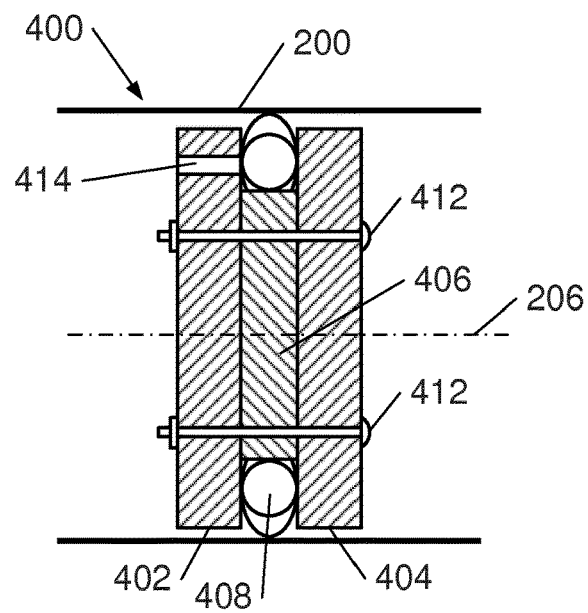
FIG. 4 shows a retaining member of the system of FIG. 3 in more detail.

Preferably, a system 300 according to the present invention is used to perform step 108. As shown in FIG. 3, the system 300 comprises a frame 310 on which two movable arms 306, 308 are provided, which arms 306, 308 are provided with retaining members 302, 304 at their ends. As shown in FIG. 4, the retaining members 302, 304 are provided with an inflatable annular element 408 that is clamped or fitted between two plates 402, 404 and supported on a support plate 406. In other words, the plates 402, 404, 406 together form a groove in which the annular element 408 is placed. The different plates 402, 404, 406 are, in the embodiment shown, connected to each other by bolts 412, but other connecting means, for example glue, are also possible. The plates 402, 404, 406 can also be manufactured as an integral part provided with a groove in which the annular element 408 is located.

As shown in FIG. 3, a first retaining member 302 is inserted into the first zone 214 as close as possible to the middle zone 212, which middle zone 212 may already be heated but may also be cool. Positioning the retaining member 302 close to the middle zone 212 reduces the risk of the first zone 214 deforming under the influence of the tensile force to be applied to the retaining member 302. Analogously, a second retaining member 304 is inserted into the second zone 216. This insertion is done by actuating the arms 306, 308 under the control of actuation means (not shown) provided as part of the system 300. Both arms 306, 308 can be inserted sequentially or simultaneously.

Preferably, the middle zone 212 is not heated before the retaining members 302, 304 grip their respective zones 214, 216 so that, as described below, the annular element 408 can perform its role as a thermal insulator.

As shown in FIG. 4, it is possible to insert the retaining members 302, 304 when their annular element 408 is in the lowered position. After the retaining members 302, 304 are inserted, the annular elements 408 are inflated. This can be done, for example, by supplying compressed air, or another gas or liquid, via opening 414. By inflating the annular elements 408, these will exert a pressure on the inner wall 202 of the tube 200. Such a contact causes the tube 200 to no longer be locally displaceable relative to the retaining members 302, 304 due to the friction between the annular elements 408 and the inner wall 202 of the tube 200. In other words, the retaining members 302, 304 provide a temporary fixed connection to the first and second zone 214, 216, respectively, so that these zones can be displaced.

Figure 5:
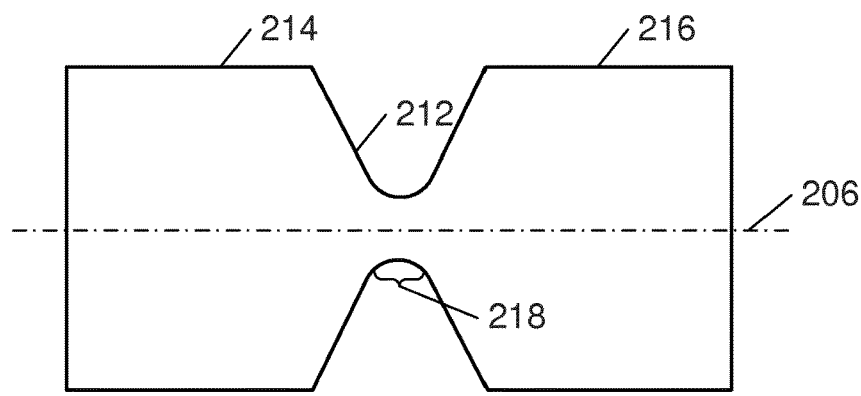
FIG. 5 shows the tube of FIG. 2 after the first and second zones have been pulled apart using the system of FIG. 4.

After inflation, one or both retaining members 302, 304 are translated so that they are pulled away from each other in the longitudinal direction 206. As a result, the zones 214, 216 are also moved away from each other, as a result of which the middle part 212 becomes smaller in diameter as shown in FIG. 5, in other words the middle part 212 narrows. In an embodiment, the annular element 408 is made of a rubber.

The shape of the retaining members 302, 304 (i.e. the shape of the cross-section almost perpendicular to the longitudinal axis 206) typically corresponds to the shape of the tube 200 so that the annular element 408 must be inflated as little as possible before it comes into contact with the inner wall 202 of the tube 200. In case the annular element 408 has to bridge a relatively large amount of space to come into contact with inner wall 202, the compressed air must be supplied under a relatively high pressure, which possibly results in the wall of the tube 200 deforming due to the pressure of the annular element 408. It will be appreciated that, in case the tube 200 has a rectangular, triangular, or other cross-section, the annular element 408 has a corresponding shape.

An additional advantage of the annular element 408 is that it partially functions as a thermal insulator, as a result of which the first and second zones 214, 216 remain relatively cool relative to the heated middle zone 212. This further reduces the risk of deformation of the first and/or the second zone 214, 216. In addition, the annular element 408 in this way prevents the heating of the middle zone 212 from having an effect on the crystal structure of the first and/or the second zone 214, 216. In other words, the heat applied to the middle zone 212 does not propagate to the 214, 216 zones due to the thermal insulator 408. Such a heating would modify the crystalline structure of 214/216, and subsequent heating of these zones would render them brittle. In an alternative embodiment, it is also possible to replace the inflatable annular element 408 with mechanical means, for example one or more bars which slide outwards in order to thus push against the wall of the tube 200. Such mechanical means are especially advantageous if the tube is made of a metal, since the mechanical means can generate a greater frictional force, so that the zones 214, 216 can be pulled away from each other in the case of a metal tube, in contrast to a rubber annular element 408 that could slip.

It will be apparent to a person skilled in the art that the system 300 is suitable for both thermoplastic tubes and metal tubes. In addition, the system 300 is also suitable for pulling apart a glass tube.

In step 110, the most central part of the middle zone 212, which part will hereinafter be referred to as the closing part 218, is pushed in such that opposing inner walls 202 come into contact with each other so that the middle zone 212 is closed. This pushing against each other can be done by means of two bars (not shown) that are pushed towards each other and between which the closing part 218 is situated. In certain embodiments, these bars can also be mounted on the frame 310 of the system 300 and can also be actuated by the same actuation means. In another embodiment, there is no need for bars, but the retaining members 302, 304 are rotated in the opposite direction relative to each other about the longitudinal axis 206 so that the middle zone 212 and, in particular, the closing part 218, rotates until the inner walls of the closing part 218 come into contact with each other. The closing of the closing part 218 can be achieved in various ways.

In a first embodiment, the closing part 218 is further heated, for example by infrared lamps or heated air or by heating the bars themselves. In particular, the temperature is raised above the melting point, as a result of which the inner walls 202 melt together and thus make the closure.

In a second embodiment, the tube 200 is formed by a co-extrusion with an inner layer of a low-density polyethylene, a linear low-density polyethylene or other heat sealable materials.

The further heating of the closing part 218 is now only necessary to the extent that the melting temperature of the inner layer of the tube 200 is to be reached. The fusion, i.e. melting, of the inner layers creates the closure.

In a third embodiment, an adhesive layer is applied locally in the middle zone 212 at least at the location of the closing part 218. By pushing the inner walls 202 against each other, the layers of glue come into contact with each other, so that they harden and form the closure.

In step 112, the first and second zones 214, 216 are separated from each other by cutting through the closure. In this way, two closed-off tubular parts are obtained. This cutting can be done by a knife (not shown), a water jet, a laser, etc. which may optionally also be mounted on the frame 310 of the system 300 and which can also be actuated by the same actuation means. It is clear here that the middle zone 212 thus splits into a first bottom part 230 and a second bottom part 232 (shown in FIG. 11). The first bottom part 230 together with the first zone 214 thus forms a first tubular part 400 and the second bottom part 232 together with the second zone 216 forms a second tubular part 400.

Each of these tubular parts 400 is transformed into the final desired container in the following steps. In particular, in step 114, at least one of the two tubular parts 400 is placed in a mould 402. In the mould 402, the tubular part 400 is heated, for example by infrared lamps 404, heated air, electric heating 404, in step 116. Since the tubular part 400 already closely matches the shape of the mould 402, the required deformation is small, so that, as described above, the walls 504 have a relatively uniform thickness. In step 118, the tubular member 400 is blow moulded against the mould 402, for example by supplying compressed air or another gas. In this way the final container is obtained which, after cooling, can be removed from the mould 402. Alternatively, step 118 may use vacuum forming and/or press forming to deform the tubular member 400 against a mould. In general, step 118 comprises deforming the tubular member 400 against a mould.

In case the container has an undercut, it is advantageous if the mould 402 consists of two separate halves. This allows, after the container has cooled sufficiently, the two halves to be moved away from each other in order to remove the container from the mould 402.

It is optionally possible, before placing the tubular part 400 in the mould 402, to place a label (not shown) in the mould 402 so that the final container is provided with a label. This is known as applying an in mould labelling.

In step 120, a lid is manufactured for the container. This lid can be manufactured in various ways which are known to a person skilled in the art. However, in an advantageous embodiment, the lid is integrally manufactured with the container. This embodiment is described in more detail with reference to FIGS. 7 and 8.

FIG. 7 shows a tube 200 of which, unlike the tube in FIG. 2, additional portions 220 are provided at the ends 208, 210. These portions 220 form an integral part of the tube 200 and are obtained by cutting certain parts away from the tube 200. This cutting away can for instance be done by a knife, a laser jet, a water jet or a counter mould. In the embodiment shown, each of the portions 220 forms an almost flat portion, but it may also be that these portions 220 are curve-shaped, for example in case the tube 200 has a cross-section which is not rectangular but rather circular. It will be appreciated that the dimensions of the additional portions 220 are large enough to form the lid 508.

Steps 104 to 118 are identical for tube 200 with additional portions 220. In this way one obtains after step 118 the container with the additional portion 220 still connected thereto. This portion is deformed to make the lid in step 120, for example by blow moulding against a mould half or by thermoforming with a press. Preferably, the blow mould steps 118 and 120 occur simultaneously.

Figure 9:
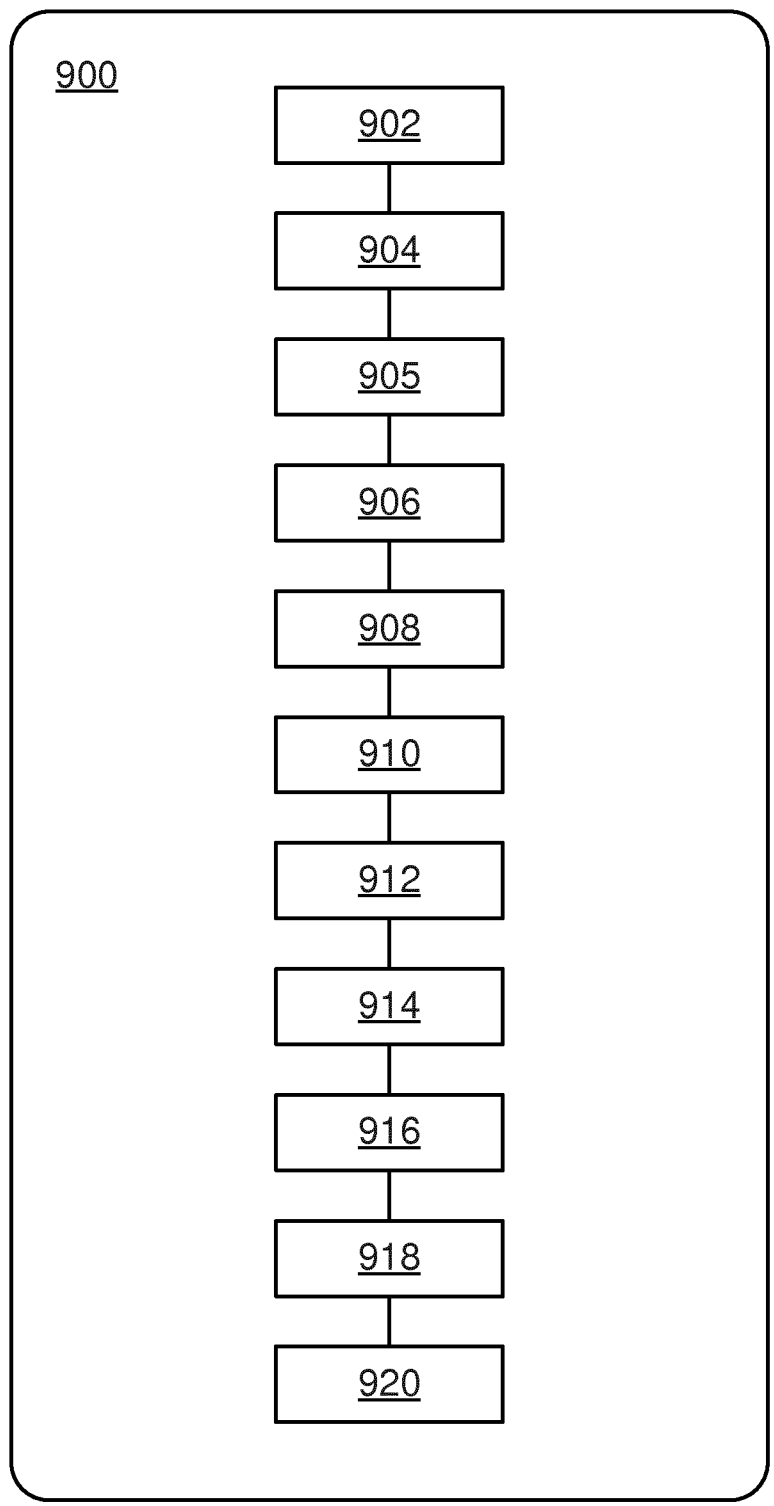
FIG. 9 shows a flowchart of an alternative method for manufacturing a thermoplastic container.

A flowchart of an alternative method 900 for manufacturing a thermoplastic container is shown in FIG. 9. Steps 902 to 912 correspond to respective steps 102 to 112 already described above. In short, these steps therefore comprise the following: manufacturing a thermoplastic container in step 902, optionally applying an ink pre-print in step 904, gripping the zones 214, 216 in step 905, locally heating the middle zone 212 in step 906, pulling apart the zones 214, 216 in step 908, closing the most central part of the middle zone 212 in step 910 (as shown in FIG. 10), and separating the first and second zones 214, 216 from each other in step 912.

In step 914, at least for one tubular part 400 but preferably for both tubular parts simultaneously (as illustrated in FIGS. 10 to 12), a bottom moulding counterform 320, 322 is positioned opposite each retaining member 302, 304 as shown in FIG. 11. Preferably, this positioning is done during the outward movement of the retaining members 302, 304 (indicated by arrows 1102) in order to save time. In particular, each bottom moulding member 320, 322 is transversely displaced so that they are slid between the separate tubular parts 400. This can be done, for example, by positioning the bottom moulding members 320, 322 on a movable arm (not shown), which arm in turn is mounted on the frame 310.

Figure 13:
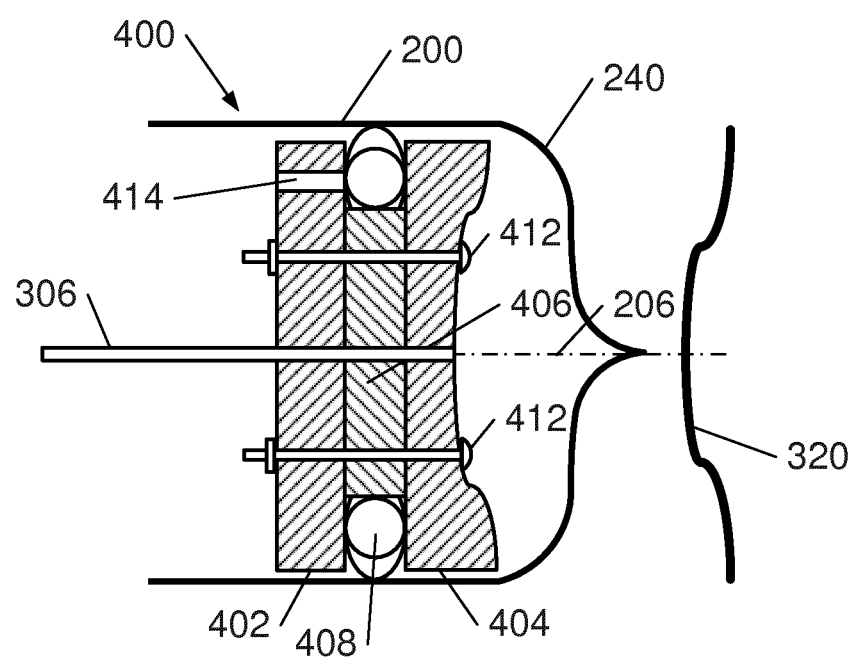
FIG. 13 shows the same view as FIG. 4 for a retaining member for use in the method of FIG. 9.

A retaining member 302, 304 for use in method 900 is shown in more detail in FIG. 13. The main difference with the retaining member of FIG. 4 is that plate 404, on its outward-facing side (i.e. the side substantially perpendicular to the longitudinal direction 206 and facing the middle zone 212), is a mould surface that has a shape corresponding to the desired shape of the bottom. A further difference is that the retaining member 302 of FIG. 13 is provided with a gas venting opening formed by making the arm 306 hollow such that gas, i.e. air, can escape from the hollow space between the mould surface and the bottom part 230. The bottom moulding members 320, 322 are then in turn provided with a counter mould surface that has a shape corresponding to the mould surface.

In step 916, the retaining members 302, 304 and the bottom moulding members 320, 322 are moved towards each other in the longitudinal direction 206 (indicated by arrows 1204) until they exert pressure on each other, whereby the bottom members 230, 232 are deformed until they have the desired shape and thus form a bottom 240, 242. During this deformation, the gas venting opening allows air which would otherwise be trapped between the mould surface and the bottom part 230, 232 to be released.

Although two bottom moulding members 320, 322 have been described above, namely one bottom moulding member for each tubular part, it will be appreciated that, in particular embodiments, only one integrally formed bottom moulding member can be provided with a counter mould surface on either side (as shown in FIG. 14). In such an embodiment, the bottom moulding member remains static while, by the movement of the retaining members 302, 304 to the static bottom moulding member, the bottom portions 230, 232 of both tubular parts 214, 216 are deformed.

In an alternative method (not shown), steps 914 and 916 are replaced by one joint step, namely vacuum moulding of one or both bottom portions 230, 232. For this purpose, use is preferably made of retaining members 302, 304 as shown in FIG. 15, namely with a plurality of gas venting openings 350 which are connected with pipes 352 to the hollow arm 306, which in turn is connected to extraction means (not shown). It will be appreciated that each of the gas venting openings 350 can also be directly connected, via pipes 352, to the extraction means. In this alternative method there is no need for bottom moulding counterforms.

The extraction means are configured to suck away the gas located between a retaining member 302, 304, in particular the mould surface thereof, and the bottom part 230, 232 via the gas venting openings 350. By sucking this gas away, i.e. creating a vacuum in the space between the retaining member 302, 304, in particular the mould surface thereof, and the bottom part 230, 232, the bottom part 230, 232 will deform until it is sucked against its respective mould surface. In other words, the bottom part 230, 232 is vacuum formed against the mould surface of the retaining member 302, 304 until they have the desired shape and thus form a bottom 240, 242.

Although the tubular part 400 formed after step 916 in itself forms container 500, which is already finished, it is possible to go through steps 918 and 920 corresponding to steps 118 and 120 in order to further adjust the shape of the tubular part if desired. These steps comprise blow moulding or vacuum forming the tubular part 400 against the mould 402 in step 918 and forming a lid in step 920.

Although certain aspects of the present invention have been described with respect to specific embodiments, it is clear that these aspects may be implemented in other forms within the scope of protection as defined by the claims.

The invention claimed is:

1. System for pulling apart a tube, which tube has an inner wall, an outer wall, a longitudinal direction, a first end, a second end, a middle zone, a first zone and a second zone, wherein the first zone extends from the middle zone to said first end and the second zone extends from the middle zone to said second end, the system comprising:
   a first retaining member which is provided for insertion into the first zone via the first end;
   a second retaining member provided for insertion into the second zone via the second end, each retaining member being adjustable between a first position in which the retaining member fits inside the tube and a second position in which, in use, the retaining member exerts a pressure on the inner wall of the tube; and
   actuation means configured to:
      insert the retaining members in their first position into their respective zone of the tube;
      subsequently bring the retaining members into their second position so that they exert a pressure on the inner wall of the tube to obtain a temporary fixed connection between a retaining member and its respective zone; and
      then move the retaining members away from each other to move the first zone and the second zone of the tube away from each other.

2. System according to claim 1, wherein each retaining member is provided with an inflatable annular element that has a deflated position in which the annular element fits inside the tube and has an inflated position in which the annular element, in use, exerts a pressure on the inner wall of the tube.

3. System according to claim 1, wherein the actuation means are further configured to: insert the first retaining member in the first zone of the tube as close as possible to the middle zone and to insert the second retaining member in the second zone of the tube as close as possible to the middle zone.

4. System according to claim 1, wherein the system further comprises heating means which are provided to heat said middle zone and wherein the actuation means are further configured to actuate the heating means to heat said middle zone before the retaining members are actuated to move away from each other.

5. System according to claim 1, wherein the tube is made from one of a metal, a glass and a thermoplastic.

6. System according to claim 1, wherein the tube is made of a thermoplastic, wherein the system further comprises splitting means that are movable substantially transversely with respect to said longitudinal direction to split the middle zone into a first portion and a second portion so that said tube is split into a first and a second tubular part, wherein the first tubular part comprises said first zone and a first bottom portion, which first bottom portion is formed by said first part of the middle zone and wherein the second tubular part comprises said second zone and a second bottom portion, which second bottom portion is formed by said second part of the middle zone, and wherein the actuation means are further configured, after the retaining members have moved away from each other, to move the splitting means transversely to split said tube into said tubular parts.

7. System according to claim 6, wherein each of said retaining members comprises a mould surface configured to be positioned substantially perpendicular to said longitudinal direction and along said middle zone, the system further comprising:
   a first bottom moulding member provided to cooperate with said first retaining member to deform said first bottom portion;
   a second bottom moulding member provided to cooperate with said second retaining member to deform said second bottom portion, each bottom moulding member comprising a counter mould surface corresponding to its respective mould surface and being configured to be positioned substantially perpendicular to said longitudinal direction and oriented towards its respective mould surface, and the actuation means being further configured to, after the splitting means have split the tube:
      position the first bottom moulding member opposite the first retaining member and the second bottom moulding member opposite the second retaining member; and
      then press the first bottom moulding member and the first retaining member against each other to deform said first bottom portion into a bottom and press the second bottom moulding member and the second retaining member against each other to deform said second bottom portion into a bottom.

8. System according to claim 7, wherein each retaining member is provided with a gas venting opening configured to vent gas from a space formed between said mould surface and said first bottom portion.

9. Method for manufacturing a thermoplastic container, the method comprising:
   a) providing a thermoplastic tube with an inner wall, an outer wall, a longitudinal direction, a first end, a second end, a middle zone, a first zone and a second zone, the first zone extending from the middle zone to said first end and the second zone extending from the middle zone to said second end;
   b) gripping said first zone and said second zone;
   c) locally heating said middle zone to the thermoforming temperature of the thermoplastic;
   d) pulling said first zone and said second zone apart along said longitudinal direction thereby narrowing the middle zone;
   e) closing a closing portion of the middle zone to obtain a closure;
   f) cutting the closed-off middle zone at the location of the closing portion to obtain two separate tubular parts; and
   g-iv) deforming at least one of said tubular parts into a container,
   wherein step b) comprises gripping said first zone and said second zone with the aid of retaining members, each of said retaining members having a mould surface which is substantially perpendicular to said longitudinal direction and is located along said middle zone, wherein step d) comprises pulling said first zone and said second zone apart along said longitudinal direction thereby narrowing the middle zone by moving said retaining members away from each other, wherein step f) comprises cutting through the closed-off middle zone at the location of the closing portion to split the middle zone into a first portion and a second portion so that said tube is split into a first and a second tubular part, the first tubular part comprising said first zone and a first bottom portion, which first bottom portion is formed by said first portion of the middle zone and the second tubular part comprising said second zone and a second bottom portion, which second bottom portion is formed by said second portion of the middle zone, and wherein step g-iv) comprises:

g-i) arranging, for at least the first tubular part, a bottom moulding member opposite a respective one of said retaining members such that said first bottom portion is located between the bottom moulding member and the respective retaining member, each bottom moulding member being provided with a counter mould surface which is substantially perpendicular to said longitudinal direction and is oriented towards its respective mould surface; and h-i) deforming said first bottom portion into a bottom by pressing the bottom moulding member and its respective retaining member against each other.

10. Method according to claim 9, wherein step a) comprises: applying an ink pre-print to an outer wall of the tube.

11. Method for manufacturing a thermoplastic container, the method comprising:
a) providing a thermoplastic tube with an inner wall, an outer wall, a longitudinal direction, a first end, a second end, a middle zone, a first zone and a second zone, the first zone extending from the middle zone to said first end and the second zone extending from the middle zone to said second end;
b) gripping said first zone and said second zone;
c) locally heating said middle zone to the thermoforming temperature of the thermoplastic;
d) pulling said first zone and said second zone apart along said longitudinal direction thereby narrowing the middle zone;
e) closing a closing portion of the middle zone to obtain a closure;
f) cutting the closed-off middle zone at the location of the closing portion to obtain two separate tubular parts; and
g-iv) deforming at least one of said tubular parts into a container, wherein step g-iv) comprises:
g-ii) placing at least one of the tubular parts in a mould;
h-ii) heating said tubular part in the mould to the thermoforming temperature of the thermoplastic; and
i-ii) deforming said tubular part against the mould to obtain said container.

12. Method according to claim 11, wherein step e) comprises: further heating at least the closing portion of said middle zone to above the melting temperature of the thermoplastic before pushing the inner walls against each other so that the pushed against one another inner walls fuse to obtain the closure.

13. Method according to claim 11, wherein step a) comprises extruding the tube.

14. Method according to claim 11, wherein step a) comprises co-extruding the tube.

15. Method to claim 11, wherein step a) comprises: applying an ink pre-print to an outer wall of the tube and wherein the ink pre-print has a design that takes into account the subsequent deformation by blow moulding in step i-ii).

16. Method according to claim 11, wherein step a) further comprises:
providing said tube with, at its first end and at its second end, a protruding portion that is integrally manufactured with the tube and wherein the method further comprises the following step:
j) deforming said protruding portion into a lid for the container.

17. Method according to claim 11, wherein step e) comprises pushing the inner wall of said closing portion against each other to obtain said closure.

18. Method according to claim 11, wherein step e) comprises rotating, around said longitudinal direction, said first zone and said second zone in the opposite direction relative to each other to obtain said closure.

19. Method for manufacturing a thermoplastic container, the method comprising:
a) providing a thermoplastic tube with an inner wall, an outer wall, a longitudinal direction, a first end, a second end, a middle zone, a first zone and a second zone, the first zone extending from the middle zone to said first end and the second zone extending from the middle zone to said second end;
b) gripping said first zone and said second zone;
c) locally heating said middle zone to the thermoforming temperature of the thermoplastic;
d) pulling said first zone and said second zone apart along said longitudinal direction thereby narrowing the middle zone;
e) closing a closing portion of the middle zone to obtain a closure;
f) cutting the closed-off middle zone at the location of the closing portion to obtain two separate tubular parts; and
g-iv) deforming at least one of said tubular parts into a container,
wherein step b) comprises gripping said first zone and said second zone with the aid of retaining members, each of said retaining members having a mould surface which is substantially perpendicular to said longitudinal direction and is located along said middle zone,
wherein step d) comprises pulling said first zone and said second zone apart along said longitudinal direction thereby narrowing the middle zone by moving said retaining members away from each other,
wherein step f) comprises cutting through the closed-off middle zone at the location of the closing portion to split the middle zone into a first portion and a second portion so that said tube is split into a first and a second tubular part, the first tubular part comprising said first zone and a first bottom portion, which first bottom portion is formed by said first portion of the middle zone and the second tubular part comprising said second zone and a second bottom portion, which second bottom portion is formed by said second portion of the middle zone, and
wherein step g-iv) comprises: g-iii) for at least the first tubular part, sucking gas away from a space between said mould surface and said first bottom portion for the purpose of deforming said first bottom portion until it abuts said mould surface.

* * * * *

UNITED STATES PATENT AND TRADEMARK OFFICE
CERTIFICATE OF CORRECTION

| | | |
|---|---|---|
| PATENT NO. | : 11,685,101 B2 | Page 1 of 1 |
| APPLICATION NO. | : 17/288058 | |
| DATED | : June 27, 2023 | |
| INVENTOR(S) | : Alain Pierre Ormeggi | |

It is certified that error appears in the above-identified patent and that said Letters Patent is hereby corrected as shown below:

In the Claims

In Column 20, Line 1, Claim 15, delete "Method to" and insert -- Method according to --, therefor.

Signed and Sealed this
Fifth Day of December, 2023

Katherine Kelly Vidal
*Director of the United States Patent and Trademark Office*